United States Patent [19]
Tonkin et al.

[11] Patent Number: 6,061,089
[45] Date of Patent: *May 9, 2000

[54] HIGH-SPEED DIGITAL VIDEO SERIAL LINK

[75] Inventors: Steven Wallace Tonkin, Eden Prairie; Mark Thomas Paulsen, Chanhassen, both of Minn.

[73] Assignee: PPT Vision, Inc., Eden Prairie, Minn.

[*] Notice: This patent is subject to a terminal disclaimer.

[21] Appl. No.: 09/348,120

[22] Filed: Jul. 2, 1999

Related U.S. Application Data

[62] Division of application No. 08/825,774, Apr. 2, 1997, which is a continuation of application No. 08/410,119, Mar. 24, 1995, abandoned.

[51] Int. Cl.[7] ................................................. H04N 5/232
[52] U.S. Cl. .......................................... 348/212; 348/211
[58] Field of Search ..................................... 348/212, 211, 348/213, 218, 12, 15, 16, 17; 370/522, 465

[56] References Cited

U.S. PATENT DOCUMENTS

| | | | |
|---|---|---|---|
| 4,326,221 | 4/1982 | Mallos et al. | 358/210 |
| 4,347,563 | 8/1982 | Paredes et al. | 364/137 |
| 4,527,270 | 7/1985 | Sweeton et al. | 371/11 |
| 4,716,585 | 12/1987 | Tompkins et al. | 379/202 |
| 4,726,018 | 2/1988 | Bux et al. | 370/89 |
| 4,833,624 | 5/1989 | Kuwahara et al. | 364/513 |
| 5,033,532 | 7/1991 | Ashida et al. | 370/62 |
| 5,206,732 | 4/1993 | Hudson | 358/209 |
| 5,229,850 | 7/1993 | Toyoshima | 358/108 |
| 5,237,408 | 8/1993 | Blum et al. | 358/108 |
| 5,270,811 | 12/1993 | Ishibashi et al. | 358/108 |
| 5,371,535 | 12/1994 | Takizawa | 348/15 |
| 5,406,322 | 4/1995 | Port et al. | 348/15 |
| 5,486,877 | 1/1996 | Tanaka | 348/722 |
| 5,533,009 | 7/1996 | Chen | 370/17 |
| 5,550,584 | 8/1996 | Yamada | 348/153 |
| 5,581,297 | 12/1996 | Koz et al. | 348/152 |
| 5,625,407 | 4/1997 | Biggs et al. | 348/16 |
| 5,717,456 | 2/1998 | Rudt et al. | 348/88 |
| 5,877,489 | 3/1999 | Ortyn et al. | 250/201.3 |

FOREIGN PATENT DOCUMENTS

512290A2  4/1992  European Pat. Off. ........ H04L 29/06

OTHER PUBLICATIONS

"High Performance Serial Bus: P1394/Draft 6.8v1", *IEEE Computer Society*, 1–340, (Mar. 21, 1994).

Bottin, D., et al., "The Use of the Reverse Channels on France—Telecom's OG Type Cable Networks", Symposium Record Cable Sessions, 18th International Television Symposium and Technical Exhibition, Montreux, Switzerland., pp. 657–672, (Jun. 11, 1993).

Thouvenot, N., "Urban Video Surveillance System", 1225 Electrical Communication, 2nd Quater, Paris, France, pp. 143–147, (1994).

*Primary Examiner*—Wendy R. Garber
*Assistant Examiner*—Aung S. Moe
*Attorney, Agent, or Firm*—Schwegman, Lundberg, Woessner & Kluth, P.A.

[57] ABSTRACT

A system for bi-directional digital serial communication and control of remote units including video cameras and input/output devices in machine vision systems. The communication system includes a main processor, communication hubs and remote units. The system is capable of monitoring and controlling the remote units in real-time while receiving video data images from the remote video cameras. Digital signals are transmitted in two different protocols; one for data communications, and one for control communications.

20 Claims, 15 Drawing Sheets

HIGH-SPEED DIGITAL VIDEO SERIAL LINK

This is a divisional of Ser. No. 08/825,774 filed Apr. 2, 1997, which is a continuation of Ser. No. 08/410,119, filed Mar. 24, 1995, now abandoned.

TECHNICAL FIELD OF THE INVENTION

The present invention relates generally to high speed digital serial communication and in particular to high speed digital communication for video data signals and control.

BACKGROUND OF THE INVENTION

In conventional machine vision communication and control systems, a processor is connected to remote devices such as video cameras using a cable having numerous conductors. The cable includes multiple control lines for controlling operations of the camera. These operations can include focusing the camera, positioning the camera, and capturing a picture. The cable also includes data, synchronization and timing lines for transmitting video signals from the camera to the processor and additional lines for supplying power to the camera.

Different control systems have been used to control a plurality of cameras. One system uses a plurality of cameras, each requiring a separate controller and a separate communication cable. This system becomes cost prohibitive to implement as the number of remote cameras increase. In another system, one controller can communicate with more than one camera. This system, however, requires that all cameras be the same type and that only one camera acquire an image at a time. Both of these systems have difficulty achieving the speed and flexibility required to control a plurality of cameras simultaneously and are limited in the number of cameras which can be controlled. In a manufacturing setting where real-time control of a number of different devices is needed, such conventional systems are impractical and often undesirably expensive.

The distance which a controller and camera can be separated is limited by the cost and operating characteristics of the cable. A cable having numerous conductors is expensive to purchase, install and maintain. Further, most video cameras' output signals are in an analog format which is susceptible to noise and attenuation losses, distortion, cross talk and ringing over long transmission cable distances. The cameras, therefore, must be located in proximity to the controller, further reducing the flexibility of such systems. A typical maximum distance between a controller and a camera is approximately 100 feet.

A further disadvantage of conventional systems is poor interchangeability of different types of cameras. That is, because a camera is connected to the controller with a specific cable, changing a camera may require a cable of a different configuration. If the new camera uses a different communication format, further modifications to the controller are required. Finally, operating characteristics which vary among cameras such as horizontal and vertical timing cannot be easily adjusted remotely.

For the reasons stated above, and for other reasons stated below which will become apparent to those skilled in the art upon reading and understanding the present specification, there is a need in the art for a fast, flexible and inexpensive communication and control system for video cameras and other remote devices.

SUMMARY OF THE INVENTION

The above mentioned problems with communication and control systems and other problems are addressed by the present invention and which will be understood by reading and studying the following specification. A communication and control system is described which provides real-time bi-directional communication and control of a plurality of remote devices, such as video cameras.

The present invention provides a high speed digital serial communication and control system, and corresponding methods of operation, for use in machine vision systems. The invention allows for real-time remote control of cameras and other input/output devices. The digital transmission of video data can include data error checking and has more noise immunity than conventional systems. The present invention uses simpler cheaper cables, increases the distance between the remote units and a main processor, allows for the easy mixing of camera types and provides the option of expanding the system by adding additional secondary hubs and cameras. The present invention simplifies the main processor and allows for the simultaneous acquisition of images from a plurality of remote video cameras. The invention allows a plurality of remote units to communicate with a main processor either with or without an intermediate communication hub. The remote units can be video cameras transmitting digital signals. Video cameras transmitting analog signals can be used, provided an intermediate communication hub is also used.

In particular, the present invention describes a vision control system using bi-directional high speed serial digital transmissions. The system comprises a main processor for receiving and transmitting packaged digital data or control signals, a primary communication hub having a first interface and a plurality of second interfaces, the first interface connected to the main processor through a serial communication bus, and a plurality of remote video cameras having a third interface connected to one of the second interfaces. The third interface comprises a transmitter for transmitting packaged digital data or control signals and a receiver for receiving packaged digital signals. The primary communication hub manages communications between the remote video cameras and the main processor and responds to high priority communications. In an alternate embodiment, at least one remote input/output unit is connected to one of the second interfaces allowing the main processor to communicate with any variety of remote devices.

In another embodiment, at least one secondary communication hub is connected to the primary communication hub for managing communications between the primary communication hub and additional remote video cameras.

The packaged digital video data signals comprise a source address code for identifying an address origin of the digital video data signal, a destination address code identifying a final address destination of the digital video data signal, a priority code identifying a priority of the transmission, and digital video data. The digital video data signals can further include a data error detection code for detecting errors in the digital video data, and a device identification code to identify a type of video camera originating the transmission.

The packaged digital control signals comprise a source address code for identifying an address origin of the digital control signal, a destination address code identifying a final address destination of the digital control signal, a priority code identifying a priority of the transmission, and digital control commands.

In still another embodiment, a vision control system using bi-directional high speed serial digital transmissions comprises a main processor, communication hub and a plurality of remote units. The main processor comprises a receiver for receiving packaged digital signals including a header and either digital data or control signals, a memory for storing the received digital signals, and a transmitter for transmitting packaged serial digital signals. The communication hub at least distributes transmissions between the main processor and a plurality of remote video cameras. The hub comprises a main processor interface connected to the main processor for communicating with the main processor and a plurality of remote video camera interfaces connected to the plurality of remote video cameras for communication with the plurality of remote video cameras. A communication hub interface is located at each of the remote video cameras for communication with the communication hub. Another embodiment describes a digital communication system comprising at least one camera and a processor.

Another embodiment describes a method of bi-directional communication in a vision control system between a plurality of remote video cameras and a main processor. The method comprising the steps of serially transmitting digital signal packets comprising digital data or control signals and a first header from the remote video cameras to a communication hub, using the communication hub, multiplexing the digital signal packets from the remote video cameras, evaluating a destination address identifier included in the first header and transmitting at least some of the digital signal packets to the main processor, serially transmitting digital signal packets including a second header from the main processor to the communication hub, and using the communication hub, evaluating a destination address identifier included in the second header and transmitting at least some of the packets to at least one the remote video cameras.

Still another embodiment includes the steps of transmitting a high priority digital signal packet comprising a header having a high priority identifier from a camera to the communication hub, interrupting a digital signal packet being transmitted by the communication hub to the main processor in response to the high priority digital signal packet and transmitting the high priority digital signal packet from the communication hub to the main processor, and completing the transmission of the interrupted digital signal packet.

Another embodiment includes a communication protocol for transmissions between a plurality of remote video cameras and a main processor. The protocol comprises a beginning code indicating a beginning of a transmission, a source address indicating an address of the transmission origin, a destination address indicating a destination of the transmission, a priority code indicating a priority of the transmission, data or control codes, and an ending code indicating the end of the transmission.

DETAILED DESCRIPTION OF THE INVENTION

In the following detailed description of the preferred embodiment, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present inventions is defined only by the appended claims.

The digital serial link (DSL) of the present invention is a vision control system having bi-directional serial communications bus for transmitting digital data and control signals between remote video cameras and a main processor. The digital video data can be used by the main processor to generate a response based on the content of the video data. That is, the main processor can include a means for analyzing the video data so that the DSL can operate in a machine vision or image processing system.

Figure 1:
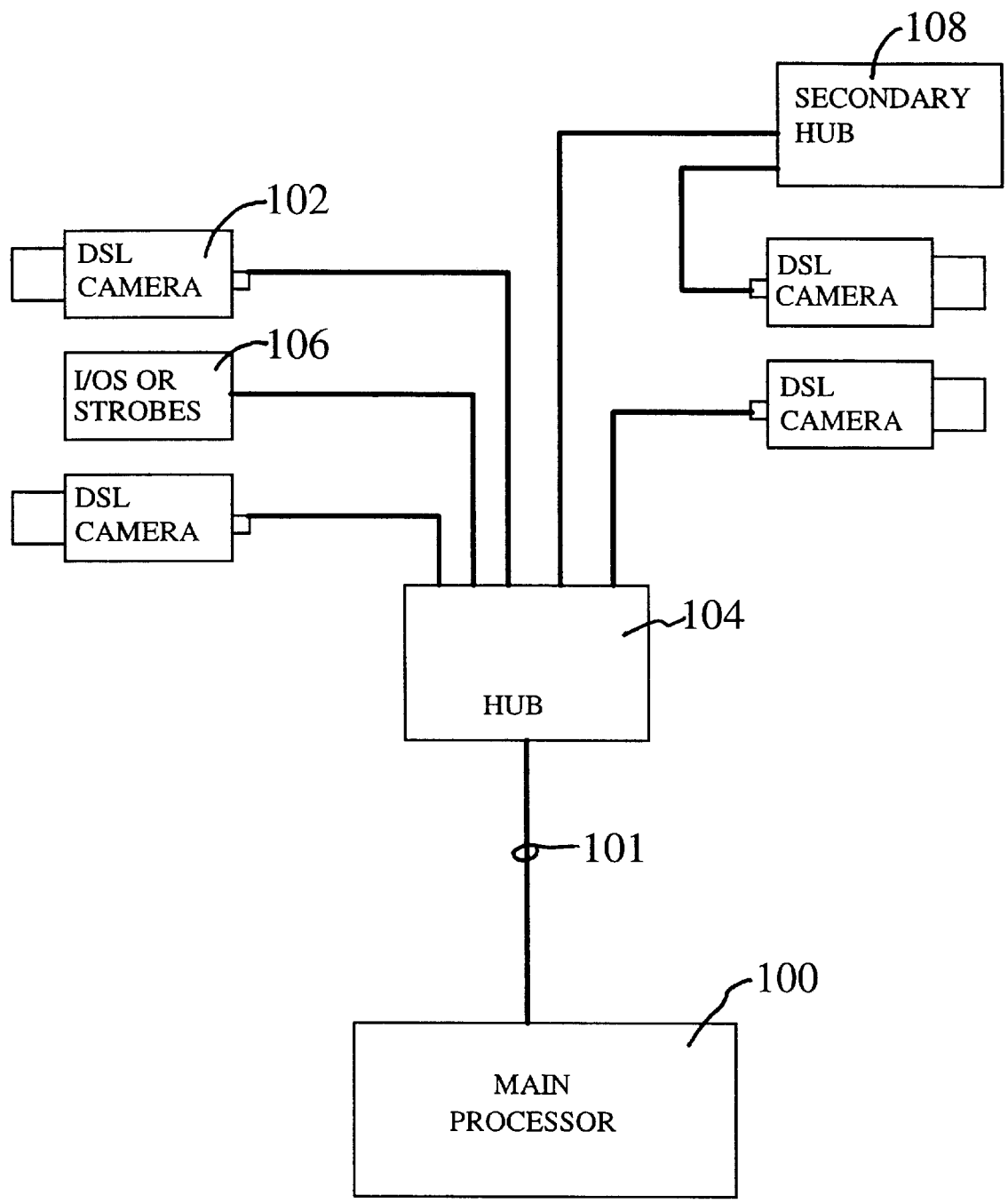
FIG. 1 is a block diagram of the digital serial link system of the present invention including a main processor, communication hub and remote units.

In the preferred embodiment, shown in FIG. 1, the DSL system has a main processor 100 and remote units 102, 106 which are connected to the main processor through a primary communication hub 104. The remote units can be video cameras 102, or input/output devices such as sensors, controls or strobe lights, generally referred to as remote units 106. Other remote units are contemplated including, but not limited to, personal computers, devices connected with RS232, programmable logic controllers and industrial control networks. It will be understood that any remote unit capable of receiving signals and generating output signals can be used in the present system. The primary hub 104 can also communicate with one or more secondary hubs 108. The secondary hubs function in a similar manner as the primary hub and are connected to additional remote units to thereby increase both the system's total capacity of remote units and the distance between remote units and the main processor. Distances of up to 250 feet can be achieved using low cost twisted pairs of wires between a primary hub and either a secondary hub or a remote unit. This distance can be greatly increased using higher cost links such as fiber optic lines. The primary hub multiplexes data from the remote units and secondary hubs into a serial data stream connected to the main processor 100 over communication link 101. The primary hub also distributes and processes the data transmitted from the main processor to the appropriate remote unit.

The communication link 101 between the main processor 100 and the primary hub 104 is preferably two twisted pairs of wires, with one pair being used for transmissions from the main processor to the primary hub and the other pair used to transmit from the primary hub to the main processor. Alternatively, fiber optic, coax cables or other communication media such as radio transmissions can be used for the communication link. The use of two separate data paths allows for independent and simultaneous communication in either direction, thereby providing the option of controlling a camera while monitoring the video signal transmitted by that camera. Alternatively, such duplex communication can be achieved with frequency multiplexing or other such techniques.

Figure 2:
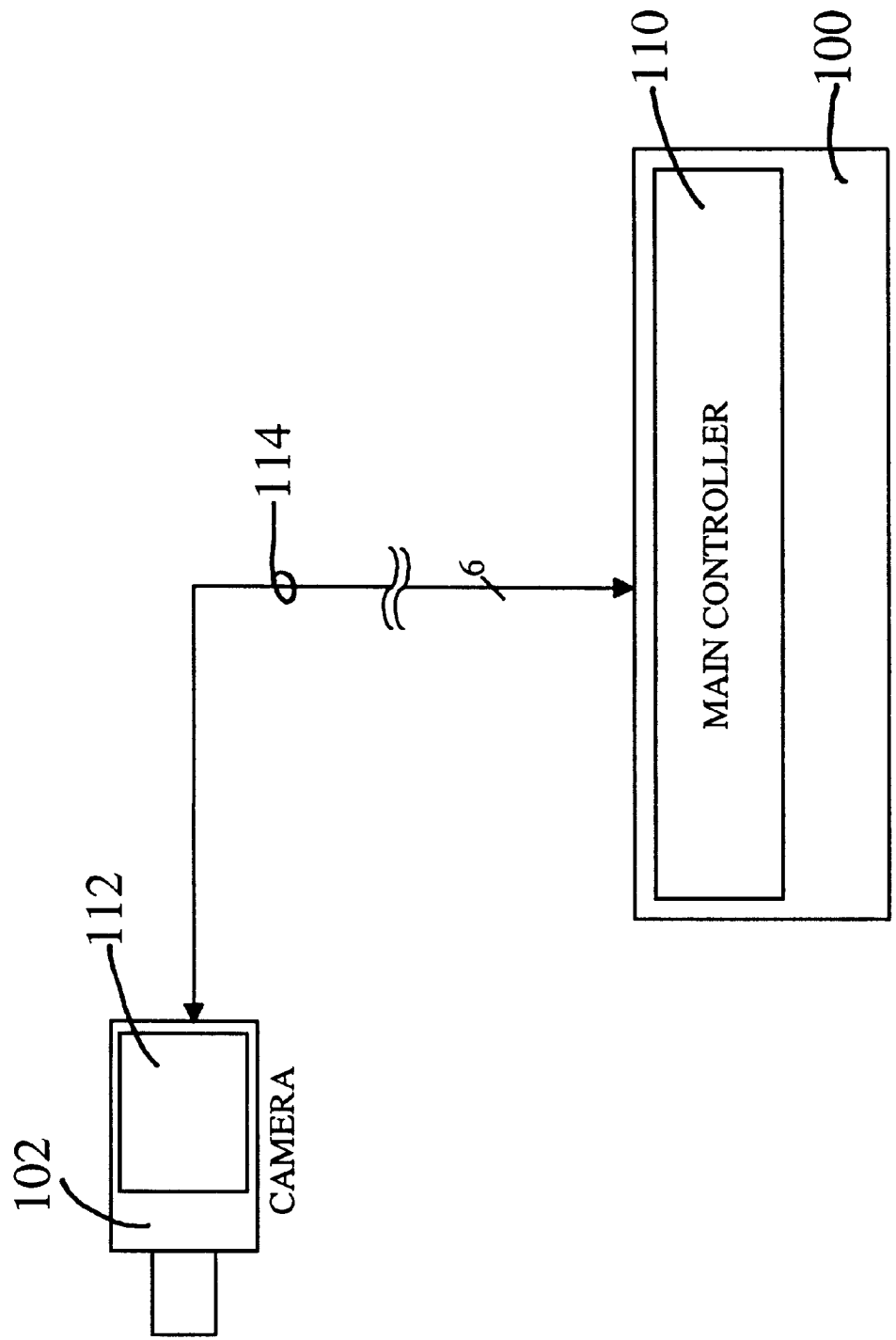
FIG. 2 is an alternate embodiment of the present invention including a main processor and a remote unit.

In an alternate embodiment where only one remote unit is used, as shown in FIG. 2, one remote unit, eg. a camera 102, can be connected directly with a main controller 10 of the main processor 100. The communication link 114 in this configuration comprises two twisted pairs, one pair for each communication direction and a pair of power supply lines (or similar communication connection for a different type of remote unit) to exchange digital video signals from the camera and control signals from the main processor.

Figure 3:
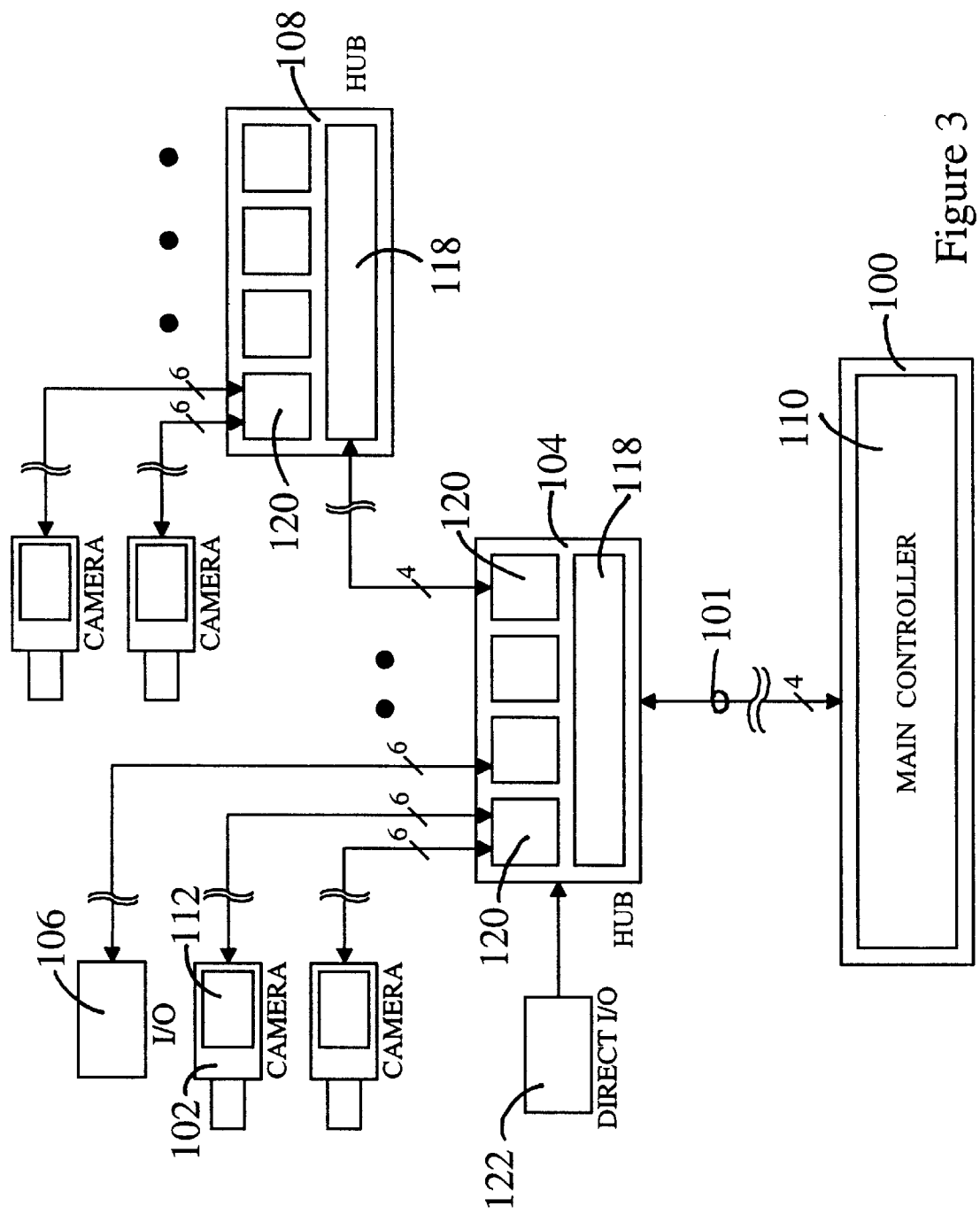
FIG. 3 is a more detailed diagram of FIG. 1.

Referring to FIG. 3, the preferred embodiment is shown in further detail. The main processor 100 has a main controller 110 for transmitting data to the primary hub and receiving data transmitted by the primary hub over link 101. The primary hub 104 has a main controller interface circuit 118 for transmitting data to the main processor and receiving data from the main processor. A plurality of remote unit interface circuits 120 connect the remote units 102, 106 and secondary hubs 108 to the primary hub 104. Each remote camera has an interface circuit 112 for processing data transmitted to and received from a hub. Direct input/output device 122 can communicate to the hub 104 directly without using a high speed serial link. These I/O devices can provide data directly to the hub which may then be used or further transmitted over the DSL.

The secondary hubs 108 are similar to the primary hub in that they have an interface circuit 118 for communication with the primary hub 104 and remote unit interface circuits 120 for communication with remote units. Before describing the interface circuits of the main processor 100, primary hub 104 and remote units, the protocol of digital serial transmissions in the system is described.

Communication Protocol

Figure 4:
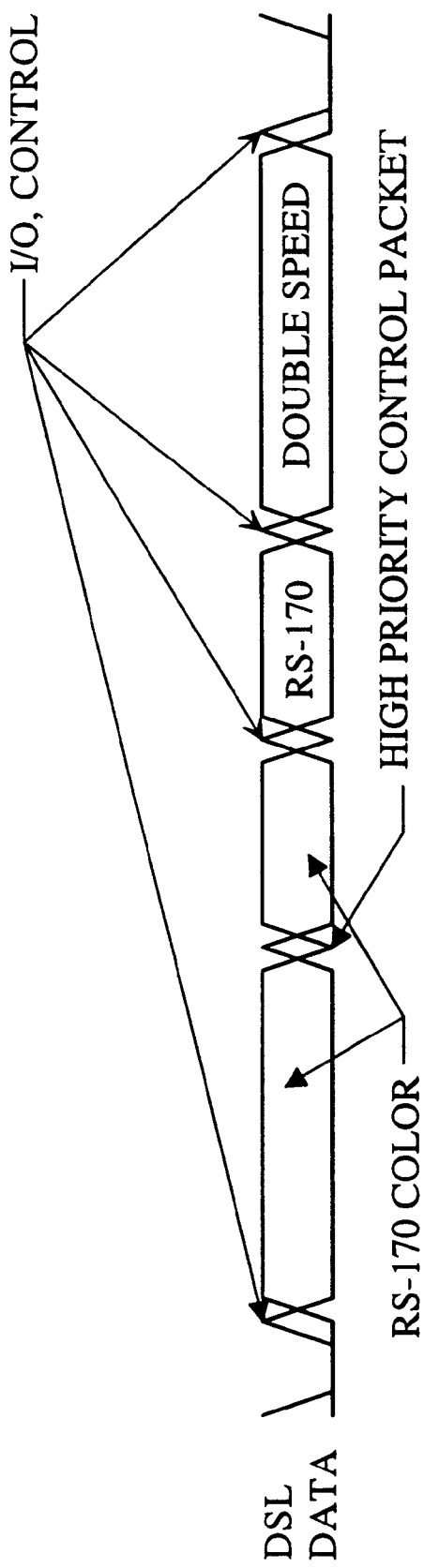
FIG. 4 illustrates a typical communication from the communication hub to the main processor of FIG. 1.

Referring to FIG. 4, data is communicated between the primary hub, the main processor and the remote devices using two distinct formats; a control packet, and a data packet. The control packet is a fixed length transmission used to provide control data. This control data can contain control information from the main processor which is directed to a remote unit to control, for example, a video camera. The control packet can be used to control operating features of the video camera such as gain, offset, shutter speed, zoom, focus, and iris aperture. The control packet can also contain requests from a remote unit for a particular service, for example, a camera may request that a strobe light be activated to assist in obtaining a video image. The control packet is preferably 81 bits long comprising nine bytes (bits 1–8) and an appended ninth bit as shown in Table 1.

TABLE 1

| Bit 9 | Bits 8–1 |
|---|---|
| 1 | Start of control packet |
| 0 | Source Address |
| 0 | Destination Address |
| 0 | (1 bit) priority code/(7 bit) device type |
| 0 | (3 bits) spare/(5 bit) data type |
| 0 | Data type index |
| 0 | Real Time Clock (lower byte) |
| 0 | Real Time Clock (upper byte) |
| 1 | End of control packet |

The ninth bit is used as a signaling bit to identify the transmission of control codes. A logical 1 indicates that a control code is included in the accompanying byte. The start of control packet is indicated by a unique identifier control code used to notify the receiver that a control packet is being transmitted. A different unique identifier can be used to indicate a high priority transmission, as described in greater detail below. That is, a high priority transmission and a standard priority transmission would have different "start of control packet" indicators. The second byte of the control packet contains the address of the original transmitting source of the control packet and the third byte contains the address of the final destination of the packet. A one bit priority code is included in the fourth byte of the control packet to indicate the priority of the communication. If the priority bit is a logical 1 the communication is high priority and a logical 0 indicates low priority. The remaining seven bits of the fourth byte are used to identify the type of device transmitting data, for example, a digital camera, line scanner or I/O device. The next byte contains five bits identifying the type of control being transmitted, for example, camera control. Three spare bits are also included in this byte. The data type index byte provides a detailed description of the control process desired. If the data type indicates a camera control, the data type index can be used to reset the camera, trigger the camera, or start and stop the transmission of video data. The data type and data type index can be considered a category and subcategory, respectively, thereby providing a means to communicate a multitude of control commands and requests. The real time clock is a 16 bit word contained in two bytes and used to identify the time in which the transmission was initiated. The real time clock can be used to monitor the efficiency of the DSL system by tracking the elapsed time between transmission and receipt. The last byte is a unique control code to identify the end of the control packet transmission.

The second communication format, a data packet, is used to provide variable length data from the transmitting device. In a transmission originating in a remote unit, such as a video camera, the data is preferably a video image. Alternatively, in a transmission originated at the main processor, the data is preferably information needed by a remote unit. The data packet can contain up to 2048 bytes of data in addition to 12 bytes of control information. The data packet format is illustrated in Table 2.

TABLE 2

| Bit 9 | Bits 8–1 |
|---|---|
| 1 | Start of data packet |
| 0 | Source address |
| 0 | Destination address |
| 0 | Priority (1 bit)/device type (7 bits) |
| 0 | Data type (5 bits)/data length (3 bits) |
| 0 | Lower 8 bits of data length |
| 0 | Real time clock (lower byte) |
| 0 | Real time clock (upper byte) |
| 1 | Start of data |
| 0 | Data |
|  | 1 . . . 2,048 bytes |
| 1 | End of data |
| 0 | Cyclic redundancy check (lower byte) |
| 0 | Cyclic redundancy check (upper byte) |
| 1 | End of data packet. |

The first four bytes of the data packet are similar to the first four bytes of the control packet. As with the data transmissions, a separate unique identifier can be used to indicate a high priority transmission. Therefore, a high priority transmission and a standard priority transmission would have different "start of data packet" indicators. The three spare bits of the fourth byte in the control packet are used in the data packet as the upper three bits of an 11 bit word used to indicate the length of the data being transmitted. The ninth bit of the data packet marks the transmission of a control code with a logic 1. The ninth bit and a unique control code are used to indicate the beginning of the data transmission. The data transmission can vary from one byte to 2048 bytes. The length of the transmission is primarily dependent upon the type of device transmitting. That is, as seen in FIG. 4, standard RS-170 video and double speed video transmit different length data packages as a result of the resolution of the video image captured by each type of video camera. Following the data transmission the ninth bit and a unique control code are used to indicate the end of the data transmission. Two bytes are used for a cyclic redundancy check (CRC). The last byte contains unique control code to signal the end of the data packet transmission.

To avoid erroneously processing transmissions from a remote unit, the ninth bit and a unique 'no-operate' code can be transmitted from the remote unit which indicates that the unit is not transmitting valid signals. This code, therefore, allows a remote unit to stop transmitting valid signals without confusing the receiver. When a receiver receives the no-operate code it remains in a hold state waiting for the no-operate code to end and valid signals to continue.

CRC is a standard data communication error detection technique incorporating the generation of a code at the transmission and the second generation of the code at the receiver using the transmitted data. The receiver compares the transmitted CRC and the second generated CRC to determine if errors occurred. A further description of CRC can be found in Cypress Semiconductor Applications Hand Book (April 1994) at 5–105. It will be understood by one skilled in the art that alternate error detection and correction techniques can be used.

The priority bit of both packets can be used to send urgent transmissions over the DSL. The primary hub typically multiplexes transmissions on a first-in first-out basis. If a high priority packet is transmitted to the hub, however, the hub will insert the packet into a currently transmitted packet. The receiving circuitry will trigger on the ninth bit signal and the unique identifier codes to retrieve the high priority packet without missing any data from the currently transmitted packet. As illustrated in FIG. 4, during the transmission of an RS-170 color video data packet, transmission is interrupted and a high priority control packet is inserted in the data stream, after which the remaining data packet is transmitted. Real-time control of remote devices can, therefore, be achieved. To assist the receiving circuitry in detecting the presence of a high priority packet, the start control packet byte and start of data packet can be used to indicate the transmission of a priority packet, as described above.

Main Controller Interface Circuitry

Figure 5:
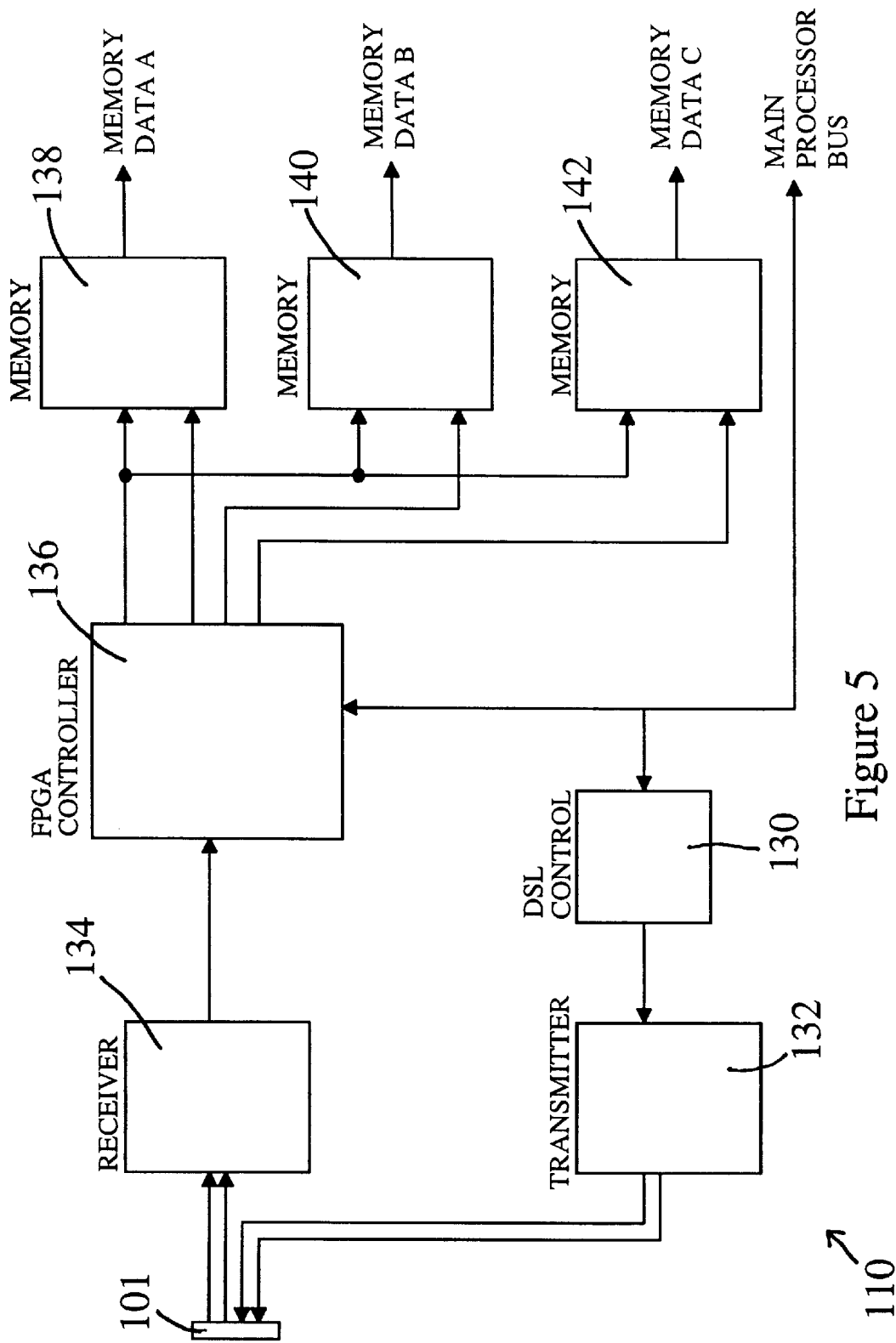
FIG. 5 is a block diagram of a main controller of the main processor of FIG. 1.
Figure 6:
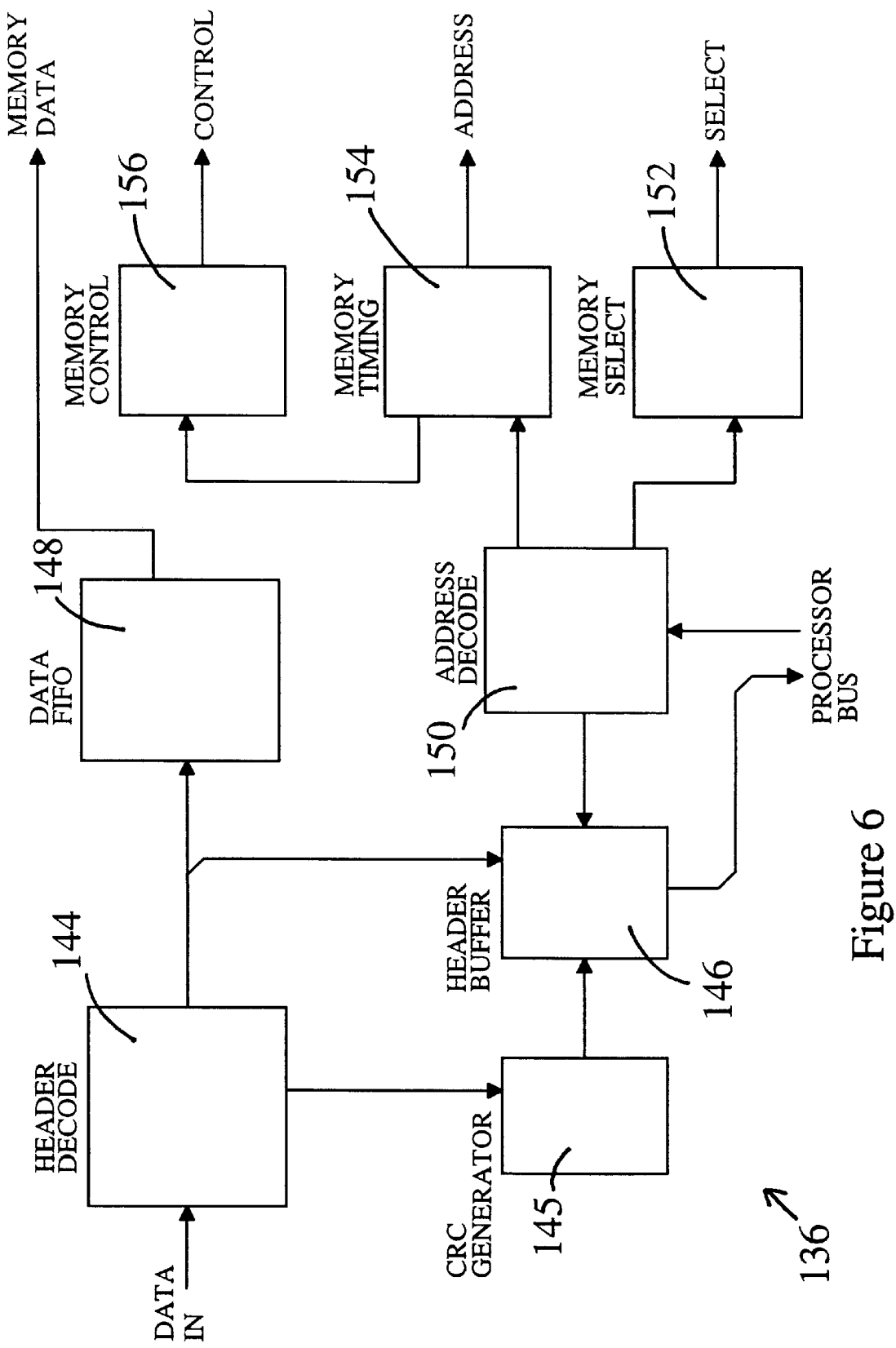
FIG. 6 is a detailed block diagram of a field programmable gate array (FPGA) controller of the main controller in FIG. 5.

Referring to FIGS. 5–6, the main controller 110 of the main processor 100 is described in detail. As described above, the main controller 110 connects the primary communication hub 104 to the main processor. That is, the main controller is an interface between the main processor and the rest of the DSL system. The controller 110 transmits control and data packets to the DSL and receives and stores packets for retrieval by the main processor. The control packets transmitted to the DSL could, for example, be used to enable different remote cameras, trigger cameras, request digital video outputs, or run built-in-self-tests (BIST) on the remote units. The control commands available are limited only by the type of remote units implemented and the above examples are not intended to limit the commands available for transmission from the main controller.

In the up-stream (toward the remote unit) direction, the main processor is connected to a DSL control circuit 130 to process upstream packets. The control 130 regulates upstream transmissions and provides the packets to transmitter 132 which transmits to a primary hub 104 over link 101. The preferred transmitters of the present system are HOTLink™ CY7B923 transmitters manufactured by CYPRESS Semiconductor Inc., San Jose, Calif. For detailed information and operation see HOTLink™ User's Guide (May 1994). In the down-stream direction transmissions are received from a primary hub by receiver 134 and processed by a field programmable gate array (FPGA) 136. It will be understood that a gate array or similar circuitry could be used in place of an FPGA. The preferred receivers of the present system are HOTLink™ CY7B933 receivers manufactured by CYPRESS Semiconductor Inc., San Jose, Calif. For detailed information and operation see HOTLINK User's Guide (May 1994). The transmissions received will typically be data packets including digital camera video and digital inputs, but other data transmissions are contemplated. The FPGA strips the header and CRC information from the received control and data packets. The video or input data is stored in memories 138, 140, 142 for access by the main processor either directly or through the FPGA. The memories are preferably synchronous dynamic random access memories (SDRAM), but can be any type of memory including video random access memories (VRAM).

The FPGA 136, as seen in FIG. 6, comprises a header decoder 144 for stripping the header and CRC generator 145 for generating the CRC code from received transmissions. The header preferably comprises the source address, destination address and the priority code of either the control or data packets. The CRC from the received transmission is accessible by the main processor through buffer 146 to check for errors in the received transmission. A copy of the header information is also stored in a buffer 146 for access by the main processor 100. Address decoder 150 is used to identify the address of the buffer which the main processor is accessing. First-in first-out (FIFO) buffer 148 provides an overflow protection for transferring the digital data to memories 138, 140, 142. The address decoder 150, memory select 152, memory address/timing 154, and refresh/ memory control 156 circuits provide management control capabilities for the memories. The main processor, therefore, can select which memory is to be used for storing the received data.

Primary Hub Interface Circuitry

Figure 7:
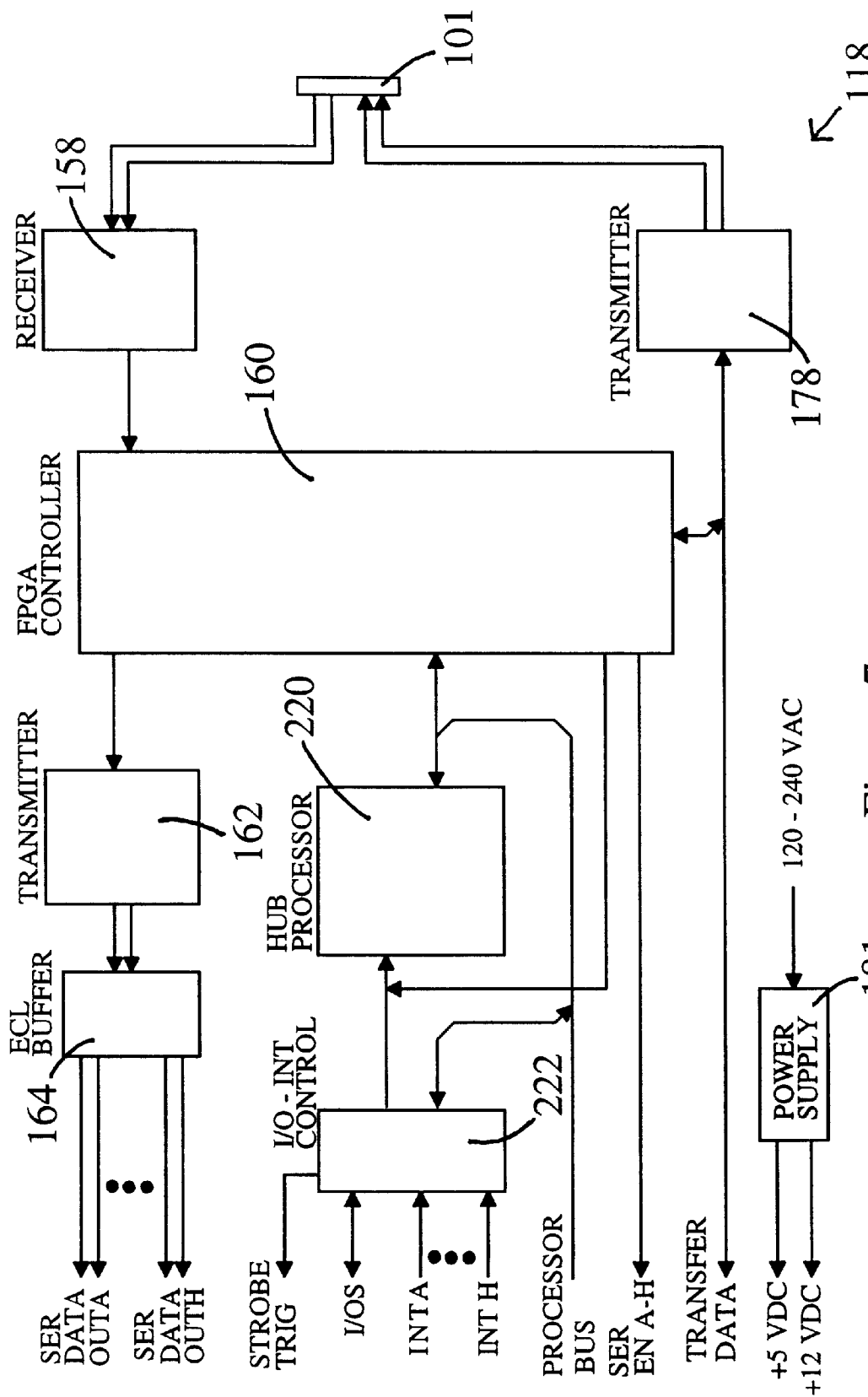
FIG. 7 is a block diagram of the main processor interface of the communication hub of FIG. 1.
Figure 8:
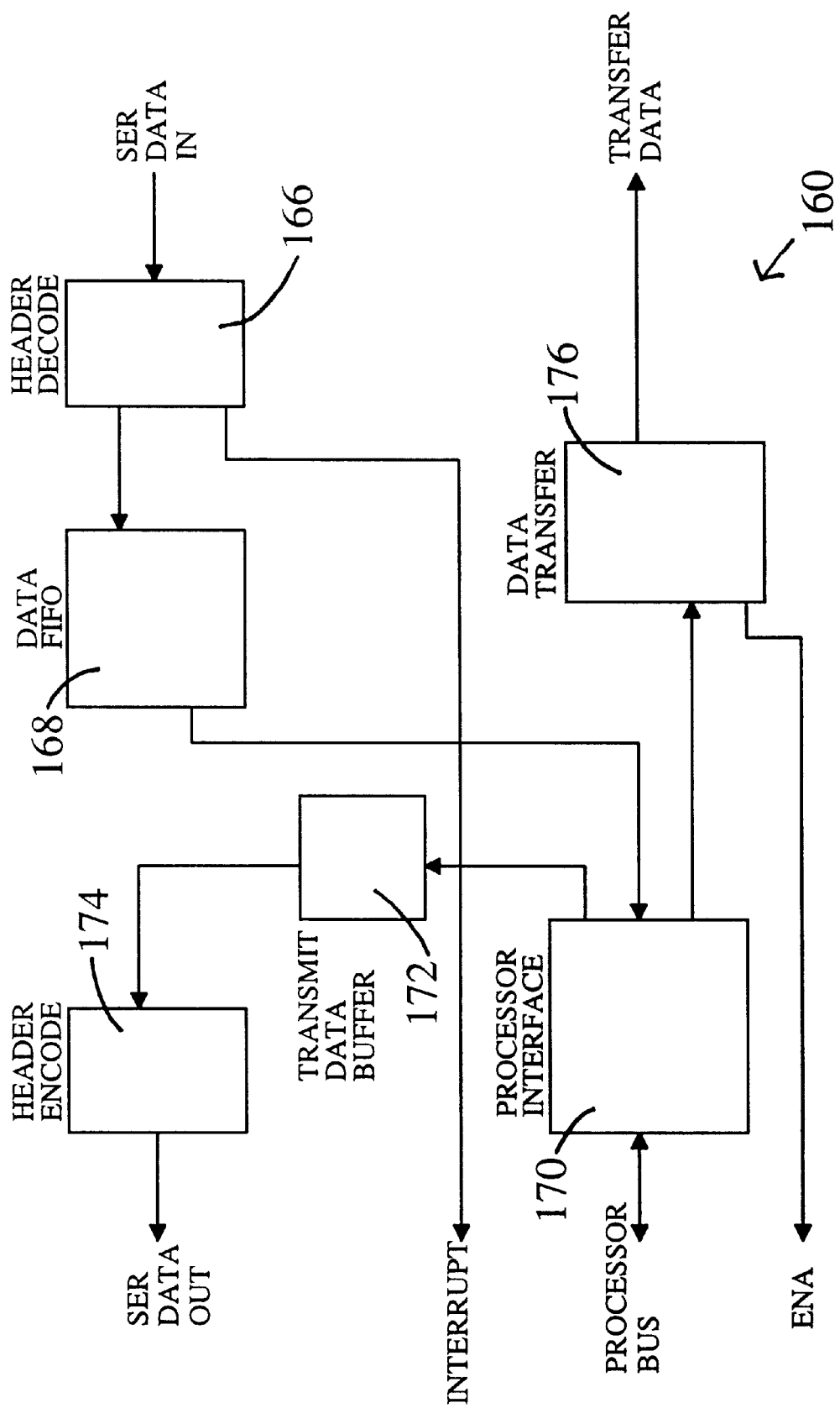
FIG. 8 is a detailed block diagram of a FPGA controller of the interface in FIG. 7.

The primary hub 104 comprises a main processor interface 118 and a plurality of remote unit interfaces 120. FIGS. 7 and 8 illustrate block diagrams of the main processor interface 118. In the up-stream direction, transmissions from the main processor 100 are received by receiver 158 and processed at FPGA 160. An up-stream transmission intended for remote units is further transmitted by transmitter 162 through buffer 164 to all the remote units connected to the primary hub.

The FPGA controller 160, of FIG. 7, of the main processor interface has an input header decoder 166 to strip the header from the transmission and store the transmission in FIFO buffer 168. Processor interface 170 determines if the primary hub is the destination address of the transmission. If the hub is the destination address, the transmitted data and header are processed and the desired operation indicated in the packet is conducted by the hub. If the hub is not the final destination, the received transmission is queued in buffer 172 and re-encoded in encoder 174. Down-stream transmissions are processed at processor interface 170 in substantially the same manner as up-stream transmissions. If the main processor is the intended destination, data transfer unit 176 transmits the signal to the main processor 100 through transmitter 178. I/O interrupt circuit 222 monitors direct I/O devices 122 and couples their outputs to the DSL. A power supply 181 is included in the primary hub to provide power to the remote units.

Figure 9:
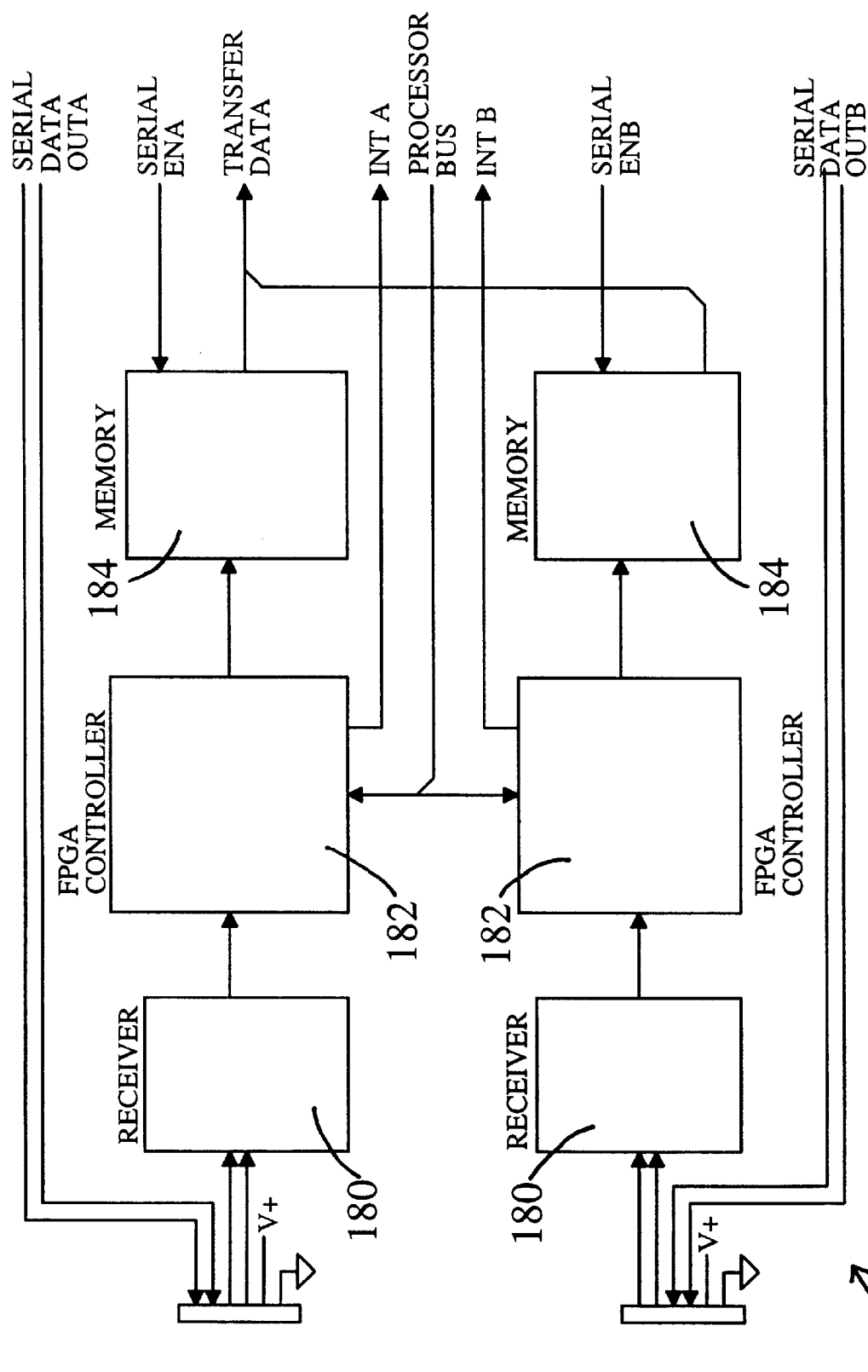
FIG. 9 is a block diagram of the remote unit interface of the communication hub of FIG. 1.
Figure 10:
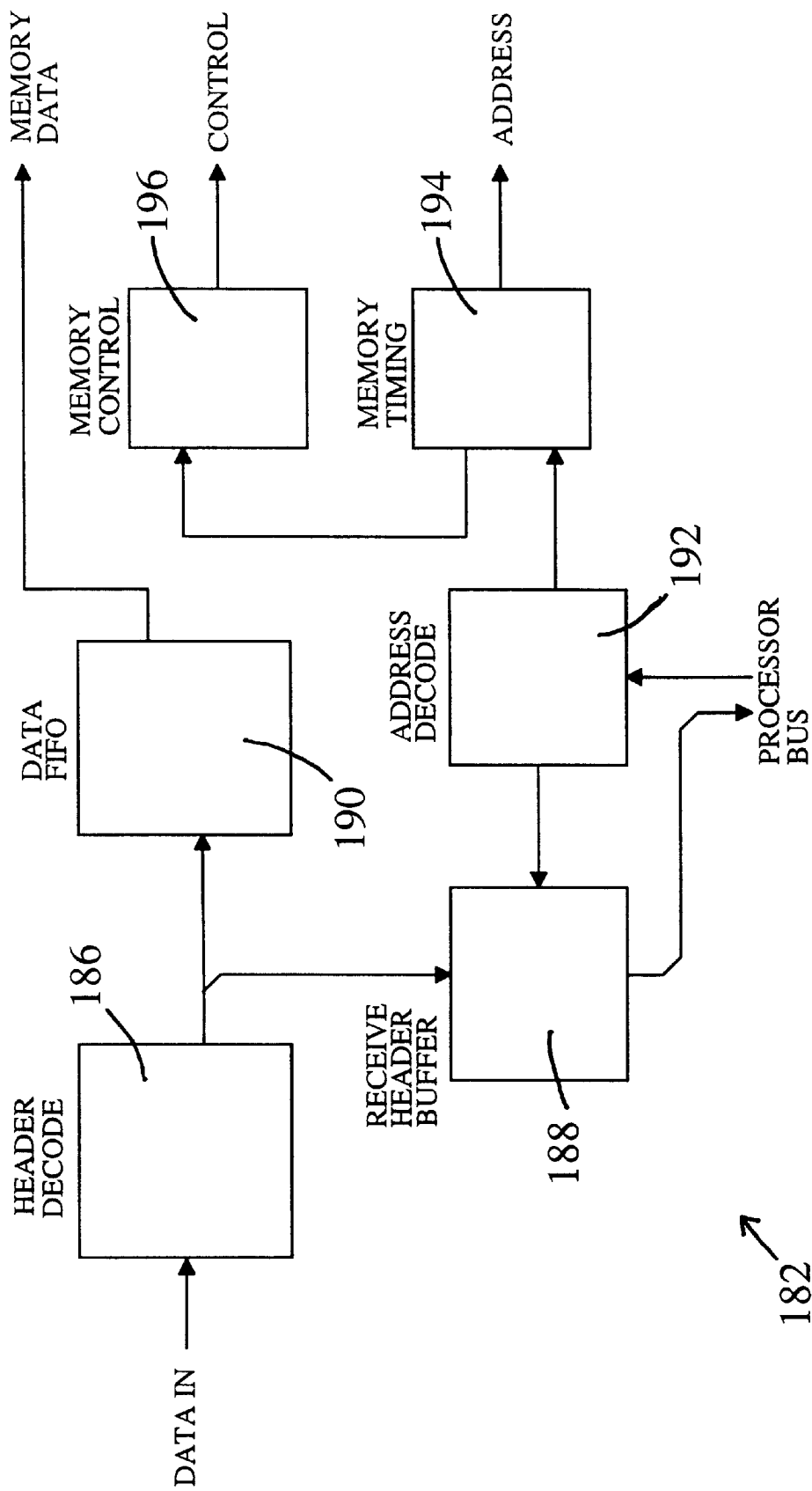
FIG. 10 is a detailed block diagram of a FPGA controller of the interface in FIG. 9.

Each remote unit interface 120 preferably interfaces with two remote units, as shown in FIG. 9. The remote unit interfaces are modular such that additional remote unit interfaces can be added to a hub to increase the number of remote units connected to the hub, see FIG. 3. The modular nature of the interfaces allows for easy expansion as a system increases in size. Up-stream transmissions merely pass through the interface and are not further processed. In the down-stream direction, however, the remote unit interface 120 has a receiver 180, FPGA controller 182 and a memory 184 associated with each remote unit interfaced. The FPGA 182 and memory 184 operate substantially the same as FPGA 136 and memories 138, 140, 142 of the main controller 110. The memories allow for the acquisition of multiple images at one time. In addition, the memories buffer data rate differences between input and output. Prior art systems can only acquire images from a limited number of cameras at one time and therefore inhibit image acquisition from other cameras connected to the system. This is a problem where the image may change during the time the camera is inhibited. Memory 184 allows the cameras to acquire an image without delaying the acquisition. The FPGA 182, as seen in FIG. 10, has a decoder 186 which strips the header from the received transmission and stores a copy of the header in buffer 188. The received transmission is placed in FIFO buffer 190 for storage in memory 184. The hub processor 220, FIG. 7, can address buffer 188 using address decoder 192. The hub processor can also control memory 184 through memory control circuit 196 and memory address/timing circuit 194.

Camera Interface

Figure 11:
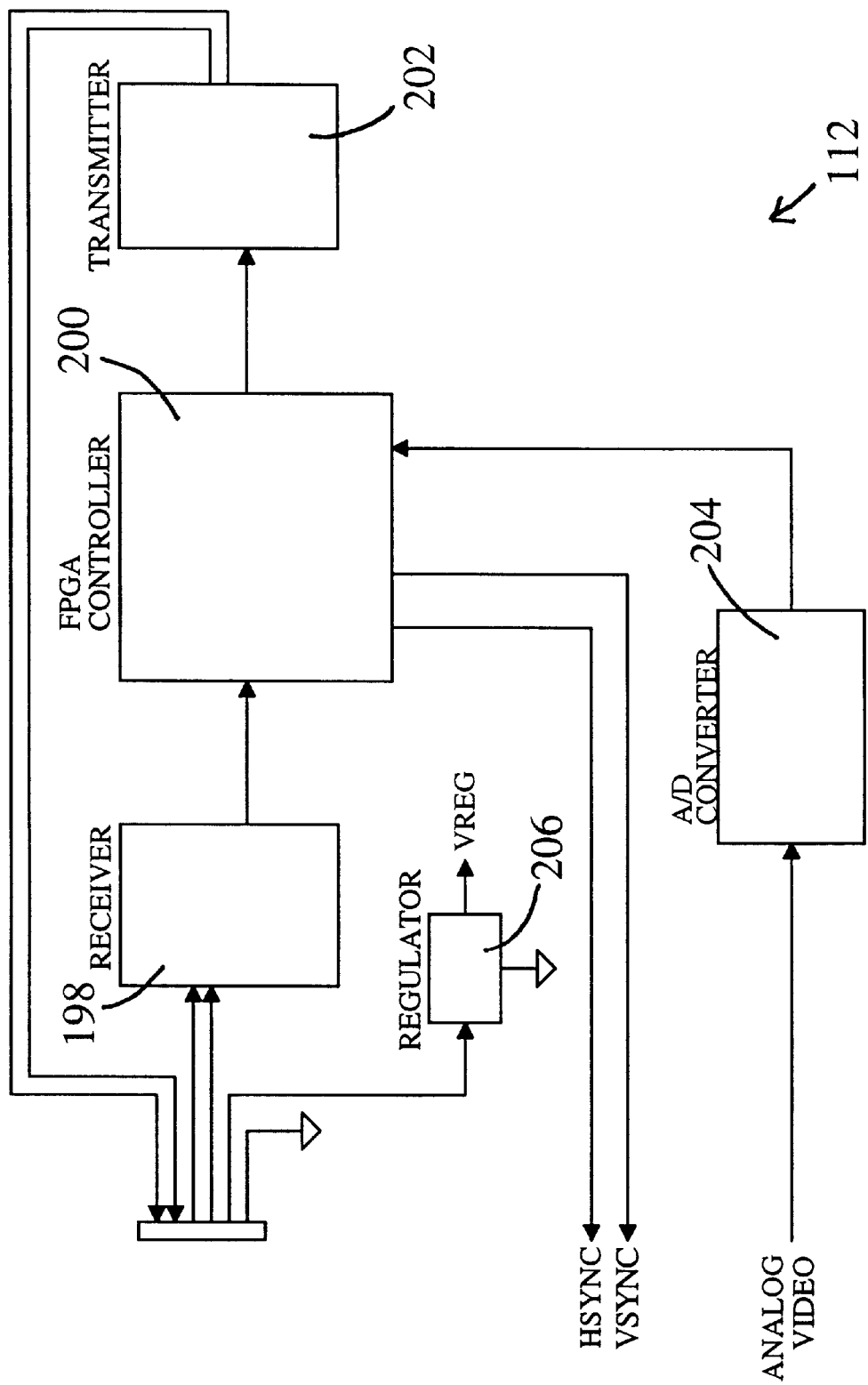
FIG. 11 is a block diagram of the interface of a remote camera of FIG. 1.
Figure 12:
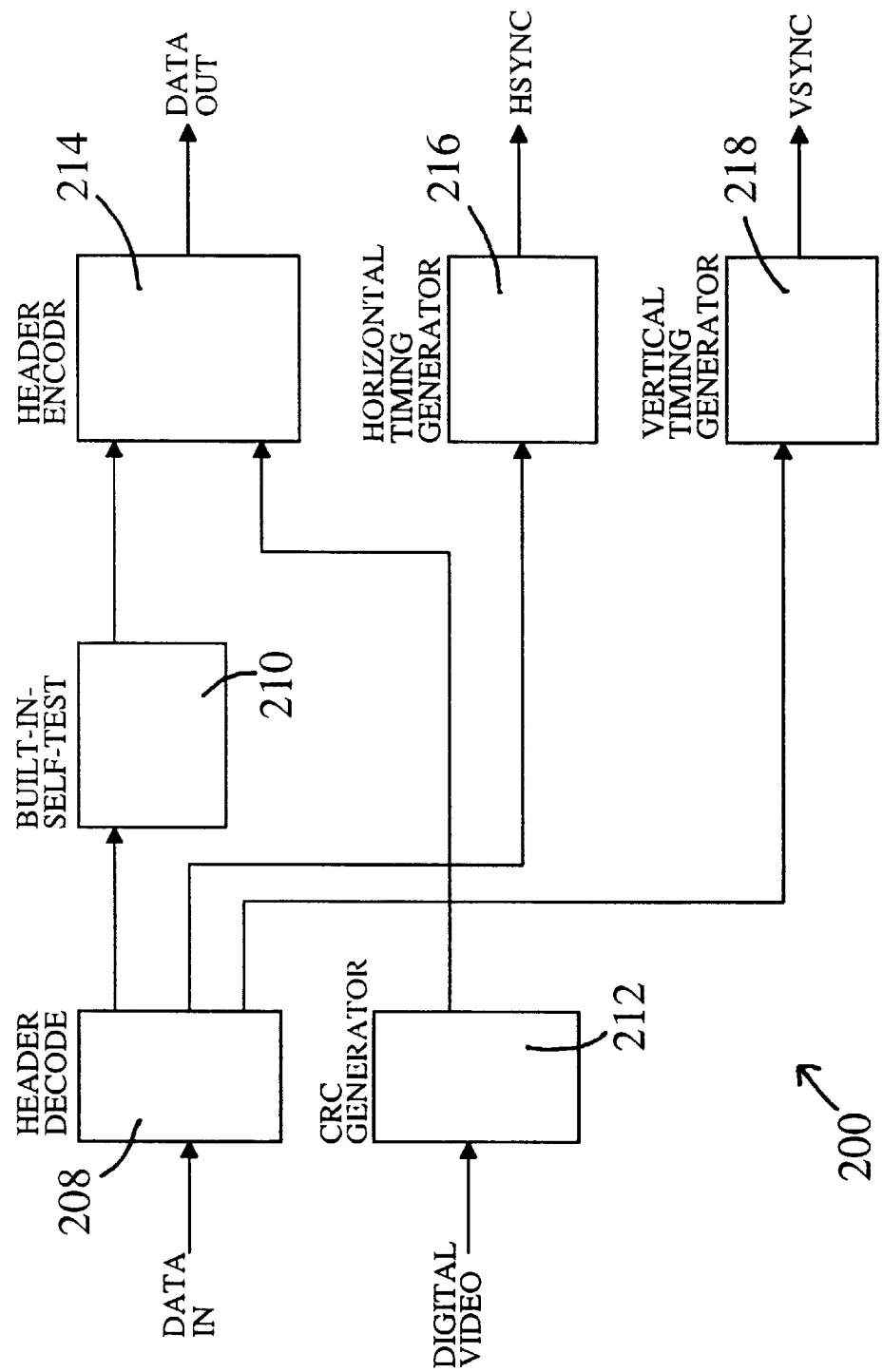
FIG. 12 is a detailed block diagram of a FPGA controller of the interface in FIG. 11.

The following is the preferred embodiment for a remote unit comprising a video camera 102. Referring to FIGS. 11 and 12, the camera has an interface 112 which contains a receiver 198 for receiving transmissions from the primary hub 104 and a transmitter 202 for transmitting to the primary hub. The interface is preferably a separate circuit which can be used with a plurality of different cameras. An alternative embodiment provides cameras containing the interface circuitry. The FPGA controller 200 controls both reception and transmission for the camera. Regulator 206 regulates power supplied by the power supply 181 of the primary hub. Analog to digital converter 204 converts an analog video signal generated by the camera into a digital video signal for transmission to the primary hub.

Figure 13:
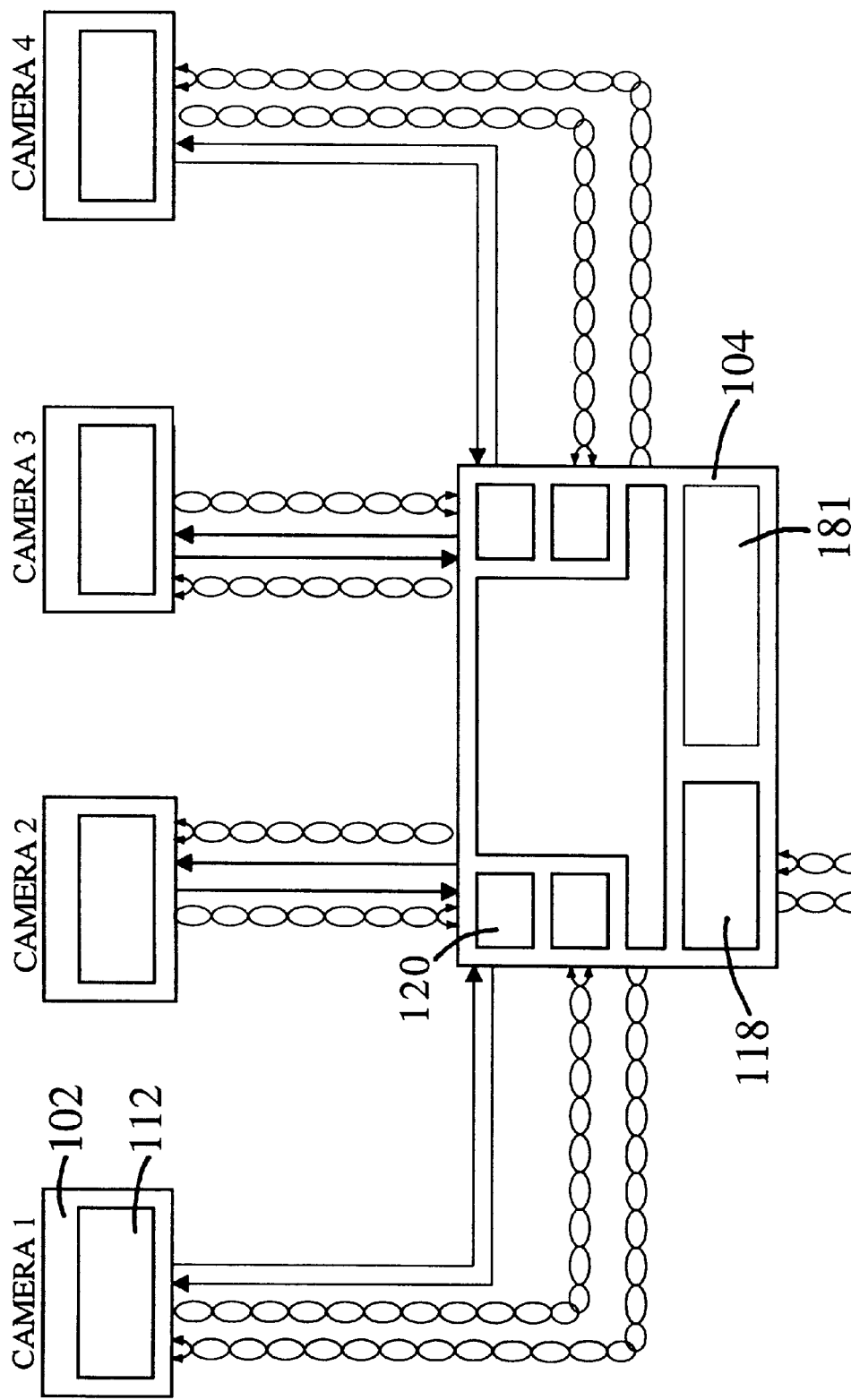
FIG. 13 is a star configuration of a number of remote cameras and a communication hub of the present invention.
Figure 14:
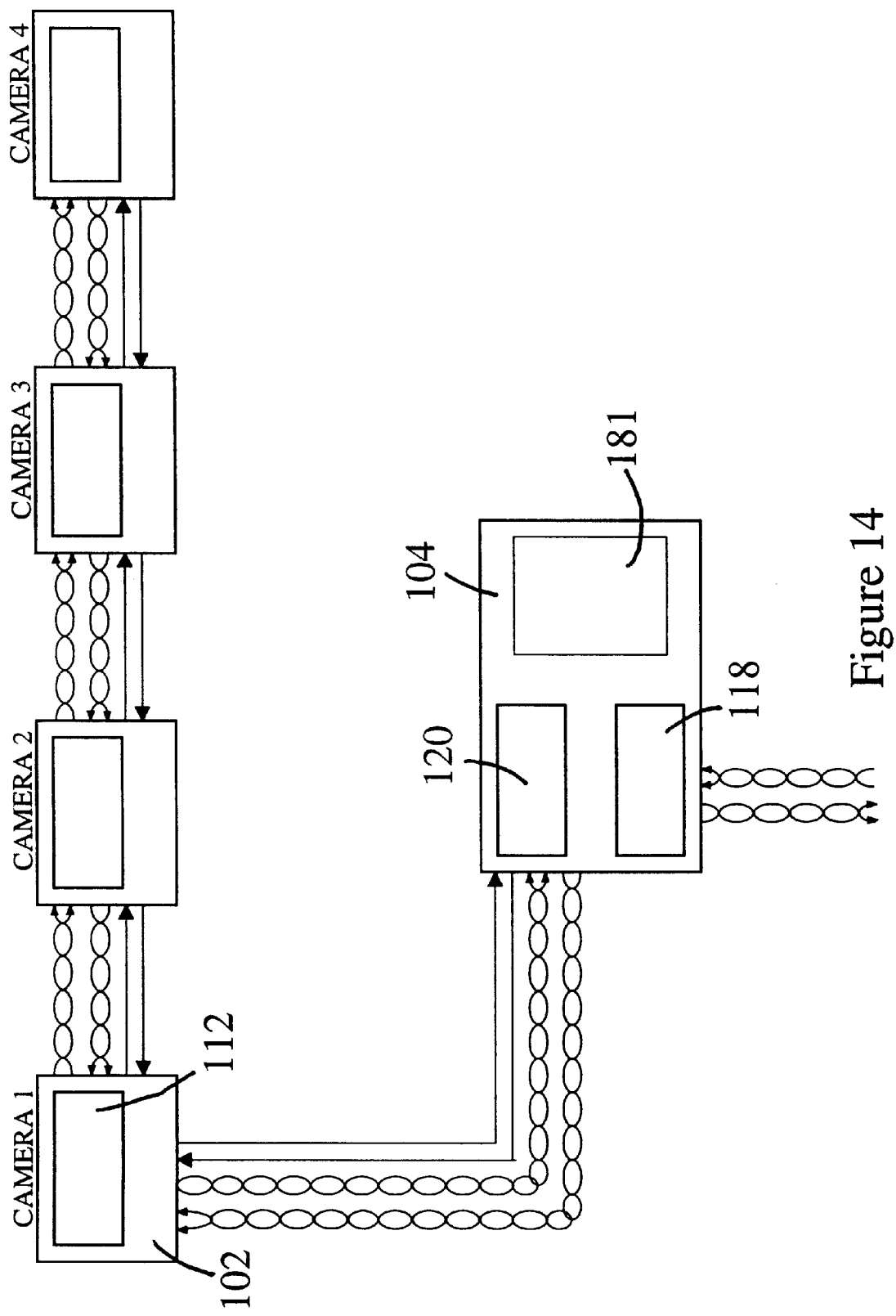
FIG. 14 is a bi-directional daisy chain configuration of a number of remote cameras and a communication hub of the present invention.
Figure 15:
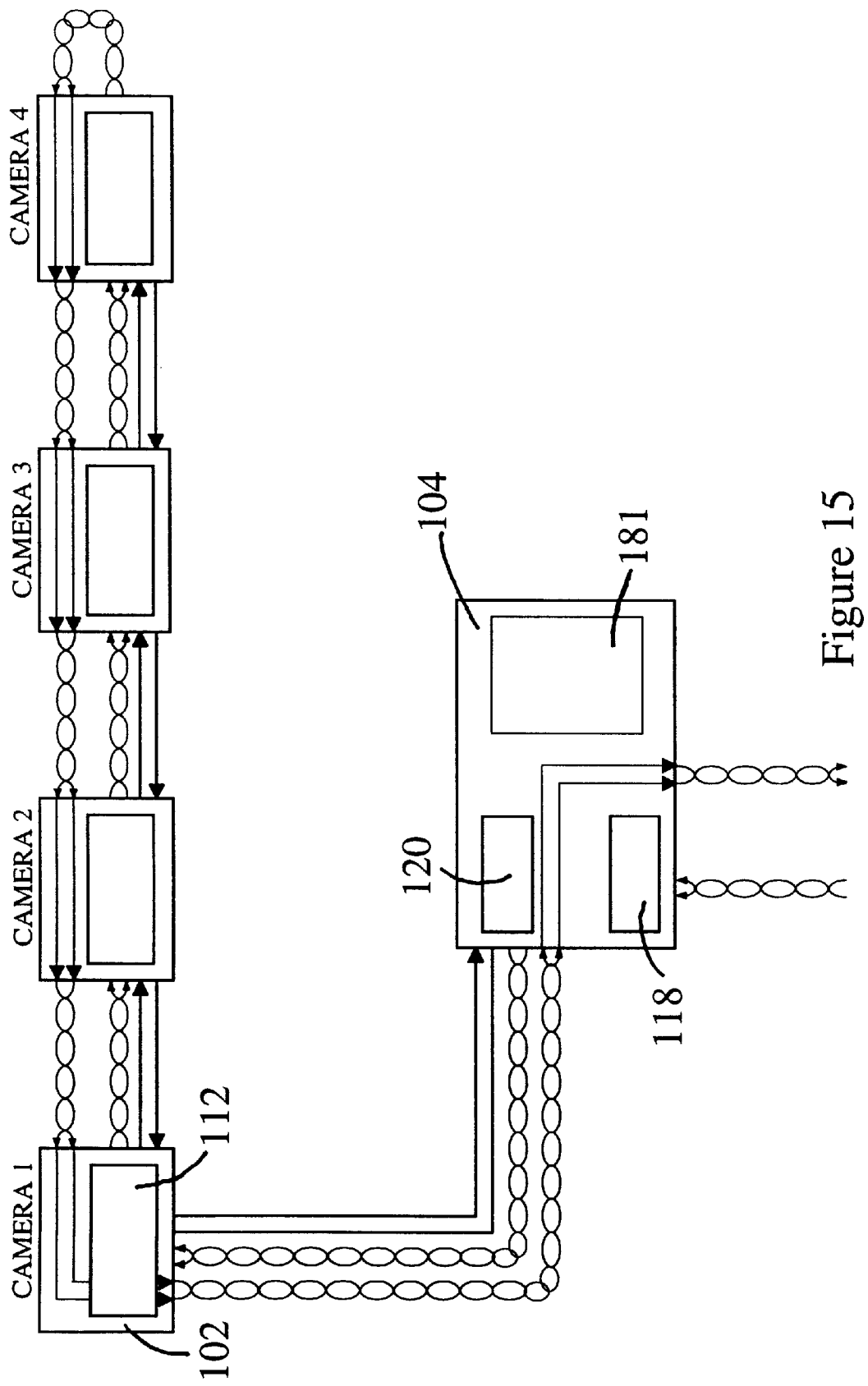
FIG. 15 is a single direction daisy chain configuration of a number of remote cameras and a communication hub of the present invention.

The FPGA 200 comprises a header decoder 208 for decoding the header and determining if the camera is the intended destination of the received signal. Preferably each remote unit has both a unique address and a global address for receiving transmissions. The unique address is used for a particular unit, while the global address is used for all of the remote units. If either address is detected, the FPGA processes the signal. A built in self test circuit 210 provides the ability to test the camera and transmit the results to the primary hub. To transmit digital video data from analog to digital converter 204, CRC generator 212 produces the CRC code bytes used in the transmitted data packet, as explained above, and encoder 214 encoded the header for the transmission. Horizontal timing generator 216 and vertical timing generator 218 are used to remotely adjust the timing of the camera depending on the type of camera used. It will be recognized that additional operating characteristics of the camera can be remotely controlled by the DSL system. FIG. 13 illustrates one preferred configuration of remote cameras. A plurality of cameras, cameras 1–4, are arranged in a star configuration. That is, each camera has a separate communication link to the primary hub 104 and is independent of the other cameras. FIG. 14 illustrates an alternative configuration of remote cameras. A plurality of cameras, cameras 1–4, are arranged in a bi-directional daisy chain configuration. That is, the communication hub communicates with the cameras over a common link. FIG. 15 illustrates another alternate configuration of remote cameras. A plurality of cameras, cameras 1–4, are arranged in a single direction daisy chain configuration. That is, the communication hub transits to one camera and receives from a different camera, with each camera connected in series.

Alternately, one skilled in the art will recognize that analog video cameras can be used to transmit to a primary or secondary hub using analog signals. Because the signals are analog, no analog-to-digital circuitry is needed at the camera. The analog signal is transformed into the digital signal as described above at the remote unit interface 120. In this embodiment, the remote unit interface 120 comprises components comparable to the converter 204, CRC generator 212 and the encoder 214 as described above. This embodiment allows for the economical use of analog cameras by not requiring a user to purchase digital camera interfaces. Further, both analog and digital cameras can be used in combination in a DSL.

Operation of the DSL System Remote Camera Communication

The DSL communication and control system as described above and shown in FIG. 1 provides communication between remote units 102, 106, at least one communication hub 104 and a main processor 100. The operation of the communication system is best understood by first examining the down stream communication from a remote video camera 102.

The camera interface 112 of FIGS. 11 and 12 receives analog video signals from the remote video camera 102 and converts the analog signal to digital using converter 204. Converting the analog signal to digital allows flexibility in camera selection. Different cameras can be used or exchanged without requiring extensive changes in cable connections as with a conventional system. Further, the horizontal and vertical timing generators 216, 218, as described in further detail below, allow for the use of different cameras without changing the camera interface 112. The digital video signal is received at FPGA controller 200 where the CRC generator 212 generates the CRC bytes of the data packet as shown above in Table 2. The digital video data and CRC are combined at the header encoder 214 to generate data packets as shown in Table 2 above. Alternatively, the FPGA controller 200 can generate control packets as previously shown in Table 1. These control packets preferably request that either the primary hub 104 or the main processor 100 perform some function, such as trigger a strobe light 106. The communications from the controller 200 are transmitted to the primary hub 104 via transmitter 202. The conductor cable between the remote video camera 102 and the primary hub 104 is shielded and preferably comprises six conductors; two for serial communication to the hub, two for serial communication from the hub and two power supply lines.

Referring to FIGS. 7 through 10, the transmitted packets from each camera are received at the primary hub by receiver 180 and processed by FPGA controller 182. The header of the packet is decoded at header decoder 186 and a copy of the header is stored in buffer 188. The received packet is stored in the FIFO buffer 190 prior to being stored in the memory 184. Address decode 192 allows the hub processor 220 to read and control buffer 188, and control the storage of the packet to the memory 184. 1/0 interrupt control circuit 222 monitors interrupt requests from a plurality of interrupt lines INT A through INT H associated with the plurality of remote units. As stated above, I/O interrupt control circuit 222 monitors direct 1/0 devices 122. If an I/O device sends a signal to the hub, a specific response or operation may be started. For example, a direct sensor may send a signal indicating that a camera acquire a picture. In response the hub will send command to the camera to take a picture. The camera will then respond back to the hub and request that a strobe be triggered.

If a transmission from a remote unit is received by the primary hub a signal is provided on the corresponding interrupt line and the control circuit 222 determines if the transmission is a high priority. A high priority signal is processed as described above such that a standard transmission is interrupted temporarily. If a high priority control packet is received from a video camera requesting that a strobe light be triggered, the primary hub immediately transmits a strobe trigger signal to the strobe 106 associated with the requesting camera.

The hub processor 220 controls the multiplexing of the data stored in the memories 184 of the remote unit interfaces 120 to the FPGA controller 160. As seen in FIG. 8, the processor interface 170 takes the output from the hub processor 220 and relays the data to the high speed data transfer circuit 176. The digital serial packet is then transmitted to the main processor by transmitter 178 via cable link 101 at 330 Mbps (mega bits per second), however, speeds of 660 Mbps can be used. It will be understood that in speeds in excess of one giga bits per second are contemplated.

The transmission is received by the main controller 110 of the main processor 100 at receiver 134. The header of the received transmission is decoded at decoder 144 and a copy of the header is stored in the buffer 146. The CRC code for received data packets is decoded at decoder 145 and a copy is also stored in buffer 146. The received packet is stored in FIFO buffer 148 prior to storage in one of the memory 138, 140, 142. Address decoder 150 allows the main processor 100 access to the header and CRC stored in the buffer 146. The main processor also controls the storage of the packets to the memory using circuits 152, 154, and 156. The main processor evaluates the received CRC code to determine if an error occurred in the transmission.

As seen in FIG. 1, secondary hubs 108 can be used to increase the number of remote units serviced by one main processor and increase the distance between a remote unit and the main processor. This hierarchical structure is implemented using the same principles as the primary hub, except the secondary hub will multiplex the remote units serviced thereby to the primary hub.

As can be seen, the present invention provides a communication and control system for receiving data and control requests from a plurality of remote units. Remote units which require immediate attention can be controlled without substantially interrupting communication with other remote units, thereby allowing image acquisition from an unlimited number of video cameras. Communication hubs can be used to respond to some of the control requests from the remote units to reduce the transmissions to the main processor and increase the speed of the system. Real-time control can, therefore, be obtained. As will be seen below, the main processor can receive data from a camera while simultaneously controlling that camera.

Main Processor Communication

The communication and control of upstream packets from the main processor is best understood starting with FIG. 3. A transmission originating at the main processor 100 is transmitted over the communication link 101 to the primary hub 104. If the intended receiving address is the primary hub, the transmission stops there. If, however, a remote unit 102 is the destination address, the transmission is broadcast to all remote units and the intended unit acts upon the received transmission.

Referring to FIGS. 5, 7–9, a communication packet originating at the main processor is transmitted over the communication link 101 to the primary hub 104 via the DSL control 130 and the transmitter 132. Receiver 158 of the main controller interface 11 8 receives the transmission packets and relays the packets to the FPGA controller 160. The headers of the packets are decoded by decoder 166 and the headers and data are stored in FIFO buffer 168. Each decoded header is evaluated at processor interface 170. If the hub is the destination address of the communication, the requested action is performed by the hub processor. If, however, the destination address is not the hub, the decoded header is transferred to the header encoder 174 through data buffer 172. The re-encoded header and data are transmitted using transmitter 162 and buffer 164 to all of the remote units over serial data lines OUT A through OUT H. Upstream transmissions effectively bypass the remote unit interfaces 120 to connect with the serial data conductor lines associated with each remote unit.

The receiver 198 of each remote camera 102 captures the up-stream transmissions and decoder 208 decodes the header. If the destination address matches an address of the remote unit the command code is followed. If the address does not match, the transmission is ignored. Each remote unit as described above preferably has a unique address and a global address such that remote units can be addressed individually or simultaneously. The command code can indicate a variety of desired operations, in particular a camera could run a self test using self test circuit 210 or the horizontal and vertical timing can be adjusted using generators 216 and 218. It will be understood that a variety of operations can be controlled remotely, and are not intended to be limited to those described.

As can be seen, the present invention provides a communication and control system for transmitting data and control commands to a plurality of remote units. The main processor can control either the remote units directly, or instruct the primary or secondary hubs to perform a specified operation. Control operations can be distributed to increase efficiency and communication speed. Real-time communication and control can, therefore, be obtained. The main processor can receive data from one camera while simultaneously controlling another camera.

SUMMARY

The present invention provides a high speed digital serial communication and control system, and corresponding methods of operation, for use in machine vision systems. The invention allows for real-time remote control of cameras and other input/output devices. The digital transmission of video data can include data error checking and has more noise immunity than conventional systems. The present invention uses simpler cheaper cables, increases the distance between the remote units and a main processor, allows for the easy mixing of camera types and provides the option of expanding the system by adding additional secondary hubs and cameras. The present invention simplifies the main processor and allows for the simultaneous acquisition of images from a plurality of remote video cameras. The invention allows a plurality of remote units to communicate with a main processor either with or without an intermediate communication hub. The remote units can be video cameras transmitting digital signals. Video Cameras transmitting analog signals can be used, provided an intermediate communication hub is also used.

What is claimed is:

1. A communications protocol for use on a high-speed machine-vision digital serial communications link comprising:

a packaged digital control packet having a first header that identifies the control packet as having control information and that provides routing information that identifies a source and a destination for the control packet on the digital serial communications link; and a packaged digital video-data packet having a second header that identifies the video-data packet as having video data and that provides routing information that identifies a source and a destination for the control packet on the digital serial communications link;

wherein the first header and the second header are directly decodeable to distinguish control packets from video-data packets in order to provide high-speed operation for a machine-vision manufacturing operation, and wherein the control packet is optionally inserted within the video-data packet such that the first header distinguishes the control pack from other information within the video-data packet without changing second header and without adding another header.

2. The communications protocol according to claim 1, wherein the control packet and the video-data packet each comprise a plurality of units of information, and the first and second header each include a designating bit that distinguishes a header unit of information from other units of information within the control packet and within the video-data packet.

3. The communications protocol according to claim 2, wherein each of the units of information passed on the digital serial communications link includes nine bits, the nine bits comprising the designating bit plus eight other bits.

4. The communications protocol according to claim 2, wherein the control packet and the video-data packet each further comprise an end-of-packet indicator, the end-of-packet indicator and the header both including the designating bit that distinguishes header and end-of-packet-indicator units of information from other units of information within the control packet and within the video-data packet.

5. The communications protocol according to claim 4, wherein each of the units of information passed on the digital serial communications link includes nine bits, the nine bits comprising the designating bit plus eight other bits.

6. A communications hub that uses the communications protocol according to claim 1, the communications hub comprising:

a processor interface connected to a main processor; and a plurality of remote video camera interfaces connected to a plurality of remote video cameras, including a first remote video camera interface and a second remote video camera interface;

wherein the processor interface comprising:
      a receiver that receives packaged digital transmissions from the main processor,
      a first transmitter that transmits packaged serial digital signals to at least one of the plurality of remote video cameras on the first remote video camera interface,
      a second transmitter that transmits packaged serial digital signals to at least one of the plurality of remote video cameras over the second remote video camera interface, and
      a third transmitter that transmits packaged signals to the main processor over the processor interface;

wherein each one of the plurality of remote video camera interfaces comprises:
      a receiver associated with each of the plurality of remote video cameras,
      a controller associated with each receiver for controlling transmissions from one of the plurality of remote video cameras, and
      a memory for storing the transmissions; and wherein the communication hub is adapted to start a transmission of the video-data packet, and before completion thereof, insert the control packet within the transmission, and then complete the transmission of the video-data packet.

7. A machine vision control system for use in a manufacturing environment using two-directional high speed serial digital transmissions, the system comprising the communications hub according to claim 6, and further comprising:

the main processor coupled to the communications hub, and comprising;
      a receiver that receives packaged digital signals including a header and either digital data and control signals,
      a memory that stores the received digital signals,
      a transmitter that transmits packaged serial digital signals, and an analyzer circuit that analyzes received video image data and generates a content-analysis response based upon content of the video image data, the plurality of remote cameras coupled to the communications hub and each having a communication hub interface for communication with the communication hub, the video camera comprising a transmitter, a receiver, and a controller for controlling communication with the communication hub;

wherein the communication hub distributes transmissions between the main processor and the plurality of remote video cameras.

8. The communications protocol according to claim 1, wherein the control packet and the video-data packet each further comprise an end-of-packet indicator, the end-of-packet indicator including a designating bit that distinguishes end-of-packet-indicators from other units of information in the respective packets.

9. The communications protocol according to claim 8, wherein each of the units of information passed on the digital serial communications link includes nine bits, the nine bits comprising the designating bit plus eight other bits.

10. A method of operating a machine vision control system having a plurality of remote video cameras including a first remote camera, and a main processor connected to the plurality of remote cameras by a digital serial link that includes a communication hub, the method comprising:

receiving an input trigger signal from a trigger source;

generating a digital control packet, including a first header, based upon the input trigger signal;

capturing an image of an object with the first remote video camera in response to the digital control packet;

converting the image to a digital video-data packet including a second header;

serially transmitting the digital video-data packet from the first remote video camera to the communication hub;

in the communications hub, evaluating a destination address identifier included in the second header, and transmitting the digital video-data packet to the main processor based on the evaluation; and machine-vision analyzing the digital video-data packet with the main processor to evaluate the captured image and generating a response signal based on an image content of the captured image, wherein the first header and the second header are directly decodeable to distinguish control packets from video-data packets in order to provide high-speed operation for a machine-vision manufacturing operation.

11. The method according to claim 10, wherein the control packet and the video-data packet each further comprise a header unit of information and a plurality of other units of information, each unit of information including a designating bit that distinguishes a header unit of information from other units of information in the respective packets.

12. The method according to claim 11, wherein each of the units of information passed on the digital serial communications link includes nine bits, the nine bits comprising the designating bit plus eight other bits.

13. The method according to claim 10, wherein the control packet and the video-data packet each further comprise an end-of-packet indicator, the end-of-packet indicator including a designating bit that distinguishes end-of-packet-indicators from other units of information in the respective packets.

14. The method according to claim 13, wherein each of the units of information passed on the digital serial communications link includes nine bits, the nine bits comprising the designating bit plus eight other bits.

15. The method according to claim 10, further comprising in the communications hub, inserting a control packet having a third header within the video-data packet such that the third header distinguishes the control packet with the third header from other information within the video-data packet without changing the second header and without adding another header.

16. A machine-vision control system for use in a manufacturing environment using two-directional high-speed serial digital transmissions comprising:

a main processor that receives digital video-data packets and digital control packets and that transmits digital control packets, the main processor including an analyzer circuit that analyzes received video image data and that generates and transmits a packaged digital control signal that includes a content-analysis response based upon content of the video image data;

a primary communication hub having a first interface and a plurality of second interfaces, the first interface connected to the main processor through a serial communication bus that transmits and receives the packaged digital data and control signals;

a plurality of remote video cameras each having a third interface that is connected to one of the plurality of second interfaces for two-directional communication with the primary communication hub; and a first trigger source responsive to a manufacturing process or assembly step, that provides a signal commanding that one of the plurality of remote video cameras acquire an image;

wherein the digital video-data packets and digital control packets each have different headers that distinguish digital video-data packets from digital control packets, and the primary communication hub adapted to generate a priority response to a high priority request signal, the priority response being inserted between the beginning and end of transmission of a digital data packet carrying video information from one of the remote video cameras to the main processor, in order that high-speed automated manufacturing is performed.

17. The machine-vision control system according to claim 16, wherein the control packet and the video-data packet each further comprise a header unit of information and a plurality of other units of information, each unit of information including a designating bit that distinguishes a header unit of information from other units of information in the respective packets.

18. The machine-vision control system according to claim 17, wherein each of the units of information passed on the digital serial communications link includes nine bits, the nine bits comprising the designating bit plus eight other bits.

19. The machine-vision control system according to claim 16, wherein the control packet and the video-data packet each further comprise an end-of-packet indicator, the end-of-packet indicator including a designating bit that distinguishes end-of-packet-indicators from other units of information in the respective packets.

20. The machine-vision control system according to claim 19, wherein each of the units of information passed on the digital serial communications link includes nine bits, the nine bits comprising the designating bit plus eight other bits.

* * * * *